Figure 1:
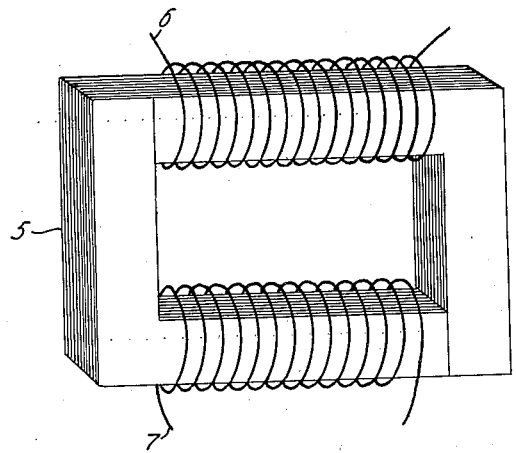

Aug. 21, 1928.

G. W. ELMEN

TRANSFORMER

Filed May 30, 1924

1,681,573

Inventor
Gustaf W. Elmen
by ―――― Att'y.

Patented Aug. 21, 1928.

1,681,573

UNITED STATES PATENT OFFICE.

GUSTAF W. ELMEN, OF LEONIA, NEW JERSEY, ASSIGNOR TO WESTERN ELECTRIC COMPANY, INCORPORATED, OF NEW YORK, N. Y., A CORPORATION OF NEW YORK.

TRANSFORMER.

Application filed May 30, 1924. Serial No. 716,845.

This invention relates in general to transformers, and more particularly to the type known as distributing transformers which are at all times connected to the line, although they may deliver power only a very small portion of the time.

The efficiency of transformers of this type is relatively high when operating at full load, but their all-day efficiency is much lower due to the losses resulting from the magnetizing current which is flowing continuously. In the smaller sizes of distributing transformers, this decrease in all-day efficiency is particularly marked, since in some cases the core loss is as much as 2% of the full load rating of the transformer. It is the object of the present invention to increase the all-day efficiency of distributing transformers not only by increasing the operating efficiency but also by decreasing the core losses which take place whether or not the transformer is delivering power.

To accomplish this object, the magnetic circuit of the distributing transformer is composed of a material having high permeability at flux densities within the working range of the transformer and an extremely low hysteresis factor.

Heretofore, silicon steel had been used generally in transformers of this type in order to secure high permeability at the magnetizing forces produced by the current passing therethrough. However, in the present case, a new core material is employed comprising iron and nickel which, when subjected to the proper heat treatment develops and retains an extremely high permeability when operated at flux densities of the order used in distributing transformers, and what is of even greater importance it has a very low hysteresis factor.

In the present instance, this material is used for the magnetic circuit of a specific type of transformer, namely, a distributing transformer in which the extremely low hysteresis factor of the material is of prime importance.

To obtain the core material for this type of transformer, iron and nickel are fused together in an induction furnace preferably in the proportion of about 21½% iron and 78½% nickel, good commercial grades of these metals being suitable for the purpose. The molten composition is poured into a mold and cooled either in the form in which it is ultimately to be used or in a convenient form to be worked over for that purpose. In the latter case, it may be drawn or rolled. While 78½% nickel and 21½% iron have been mentioned as being the proportion of the ingredients of nickel and iron to be employed in making up this crude material, it should be understood that the proportion may deviate considerably from these figures when nickel and iron are the only ingredients; and when other ingredients are included, this proportion may not apply. Other ingredients than nickel and iron may be employed for various purposes as, for example, it may be desirable to add chromium for the reason that a comparatively small quantity of this element will cause a decided increase in the resistivity of the composition, and this resistivity is a desirable factor in cutting down the eddy current loss.

To develop the utmost permeability in the magnetic material, the cores may be subjected to a heat treatment, the treatment required in any particular case varying somewhat as regards the temperature employed and duration of heating and cooling. The optimum values of these variables may be readily determined in a specific case by experiment. In the case of the particular nickel-iron composition referred to above, a suitable heat treatment has been found to be to heat the material to a temperature which will be suitable for annealing either component, then to cool at an optimum rate that must be determined by experiment. After the heat treatment, the material must be guarded against any considerable strains, and therefore the heat treatment is preferably applied to the material in its ultimate form or shape in the apparatus in which it is to be used.

Figure 2:
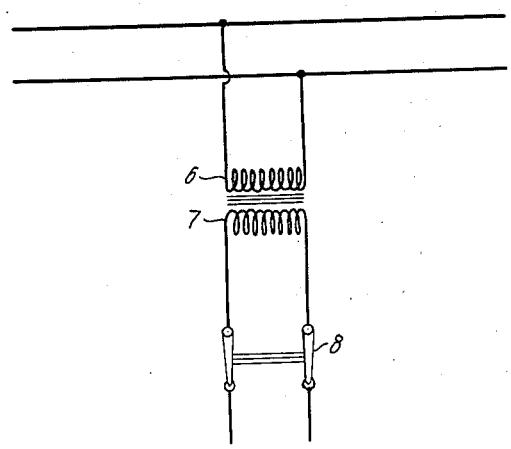

In the accompanying drawing, Fig. 1 is a schematic view of the ordinary tpye of distributing transformer, and Fig. 2 discloses the manner in which this transformer is connected to the line. The magnetic core is composed of laminations 5—5 of the magnetic core material, upon which are wound the primary winding 6 and the secondary winding 7. The primary winding in practice is connected permanently to the power line and the secondary winding is connected through suitable switching means 8 to the local circuit which may consist of lamps, motors, or other power consuming devices. An alternating current flowing through the primary winding 6 produces a varying magnetizing force which, in turn, sets up varying lines of magnetic induction in the magnetic core 5. These changing magnetic fluxes induce an electromotive force in the secondary winding 7 which is proportional at every instant to the rate of change of the magnetic flux. The electromotive force induced in the secondary winding depends upon the number of turns in the secondary winding, and also upon the rate of change of the magnetic flux within the core. The magnitude of the flux, in turn, is dependent upon the permeability of the core material at the magnetizing force produced in the magnetic core by the current in the primary winding. If a good grade of silicon steel is used as the core material and it is operated at a flux density of 5,000 lines per square centimeter, the permeability will be of the order of 6,650, while for a flux density of 9,000 lines, the permeability will be approximately 5,100. However, if the silicon steel is replaced by a nickel-iron composition containing 78½% nickel and 21½% iron, and given the proper heat treatment, a permeability of 86,000 may be obtained for a flux density of 5,000 lines and a permeability of 17,000 for a flux density of 9,000 lines. If 1% chromium is added to this composition, corresponding values of permeability for flux densities of 5,000 and 9,000 lines are 45,000 and 5,700 respectively. It will thus be seen that by the use of this material for the cores of distributing transformers, the increase in permeability for a given flux density makes it possible to do either one of two things; that is, materially reduce the magnetizing current while maintaining the size of the transformer the same or reduce the size of the transformer without increasing the core losses.

In the case of the distributing transformer, however, a much greater gain results from the extremely low hysteresis factor of the material. Thus, for the 78½% nickel and the 21½% iron composition referred to, the hysteresis loss is only about 75 ergs per centimeter cube, per cycle, for a flux density of approximately 5,000 lines per square centimeter which is approximately $\frac{1}{10}$ of the loss for a good grade of silicon steel. When operating at a flux density of approximately 10,000 lines per square centimeter, the hysteresis loss for this composition is approximately ⅕ that of silicon steel (425 ergs per centimeter cube per cycle). The eddy current loss in this material is somewhat higher than that for silicon steel; but, however, the eddy current loss is a small proportion of the total core loss and may be decreased by decreasing the thickness of the laminations or by adding a small amount of chromium to the alloy. For example, by the addition of approximately 1% chromium the eddy current loss of 78½% nickel-iron alloy is but slightly greater than for silicon steel.

In view of the low saturation point of these alloys, it is not possible to operate them at high flux densities. Thus, for example, the alloy containing 78½% nickel and 21½% iron, and also the same alloy with an addition of 1% chromium cannot be operated at flux densities much greater than 10,000 lines per square centimeter.

Since most distributing transformers are operated under load only a small portion of the time, while the magnetizing current for the transformer is flowing continuously, it follows that the decrease in core losses obtainable by the use of this nickel-iron composition results in a considerable increase in the all-day efficiency of the transformer. As an example, in the case of a 1-kva. distributing transformer, assuming that it delivers during the day what is equivalent to full load for a period of four hours, the all-day efficiency of the transformer is increased approximately 9% by substituting the 78½ nickel-iron composition in place of silicon steel as the core material. For larger transformers the gain in efficiency becomes less important since efficiency of such transformers is already high. However, by the use of the nickel-iron composition, it is possible to reduce the size of the core and thus effect a saving in both space and first cost. In this case a nickel-iron composition in which the nickel content is as low as 43% may be of advantage since such a composition permits satisfactory operation at flux densities as high as 14,000 lines per square centimeter.

What is claimed is:

1. A distributing transformer having a primary winding, a secondary winding, and a core comprising an alloy of nickel and iron, said core having a hysteresis loss at a flux density of 5,000 lines per square centimeter not greater than 100 ergs per cubic centimeter per cycle.

2. A distributing transformer having a primary winding, a secondary winding, and a core comprising an alloy of approximately 78½% nickel and 21½% iron.

3. A distributing transformer having a primary winding, a secondary winding, and a core comprising an alloy containing nickel and iron in the proportions of approximately 78½ and 21½ and including a third ingredient to increase the resistivity.

4. A distributing transformer having a primary winding, a secondary winding, and a core comprising an alloy of approximately 78½% nickel and 21½% iron to which is added 1% chromium.

5. A distributing transformer comprising a plurality of windings, one of which is continuously associated with a source of power, another of said windings being associated with a variable load, and a magnetic core encompassed by said windings, said core comprising a nickel-iron alloy having a permeability higher than iron when working at a flux density of approximately 8,000 lines per square centimeter and a hysteresis loss lower than that of iron.

In witness whereof, I hereunto subscribe my name this 27 day of May, A. D. 1924.

GUSTAF W. ELMEN.